United States Patent [19]

Ozaki et al.

[11] Patent Number: 5,015,165
[45] Date of Patent: May 14, 1991

[54] OPENING/CLOSING AND CENTERING DEVICE FOR TIRE VULCANIZER

[75] Inventors: Keiji Ozaki, Takarazuka; Seisuke Fukumura, Miki, both of Japan

[73] Assignee: Kabushiki Kaisha Kobe Seiko Sho, Kobe, Japan

[21] Appl. No.: 411,309

[22] Filed: Sep. 22, 1989

[30] Foreign Application Priority Data

Nov. 29, 1988 [JP] Japan .................. 63-303303

[51] Int. Cl.$^5$ ............................. B29C 35/00
[52] U.S. Cl. .................. 425/28.1; 425/34.1; 425/47
[58] Field of Search .......... 425/34.1, 47, 28.1, 425/35

[56] References Cited

U.S. PATENT DOCUMENTS

| 4,631,014 | 12/1986 | Drewel et al. | 425/47 |
| 4,647,273 | 3/1987 | Singh et al. | 425/35 |
| 4,804,318 | 2/1989 | Fujieda et al. | 425/47 |
| 4,822,266 | 4/1989 | Amano et al. | 425/34.1 |

Primary Examiner—Willard E. Hoag
Attorney, Agent, or Firm—Oblon, Spivak, McClelland, Maier & Neustadt

[57] ABSTRACT

In a tire vulcanizer, a single long-stroke cylinder is mounted at the central position of a top frame, and is supported to a mounting frame fixedly mounted on the top frame rather than being fixed directly to the top frame. Furthermore, a centering mechanism for a pressure plate is provided between the pressure plate and each of opposed side frames so as to adjust the levelness of the pressure plate with respect to both the longitudinal and transverse directions of the pressure plate.

1 Claim, 6 Drawing Sheets

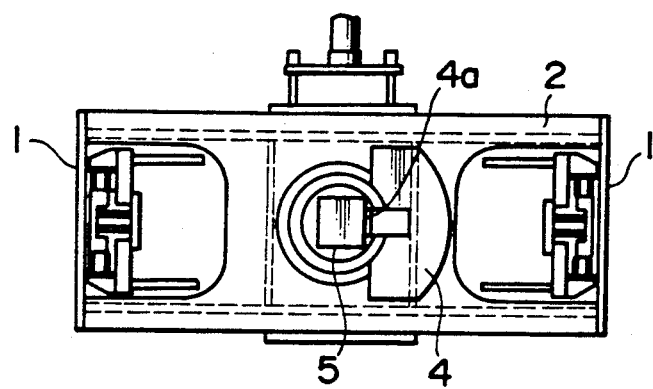
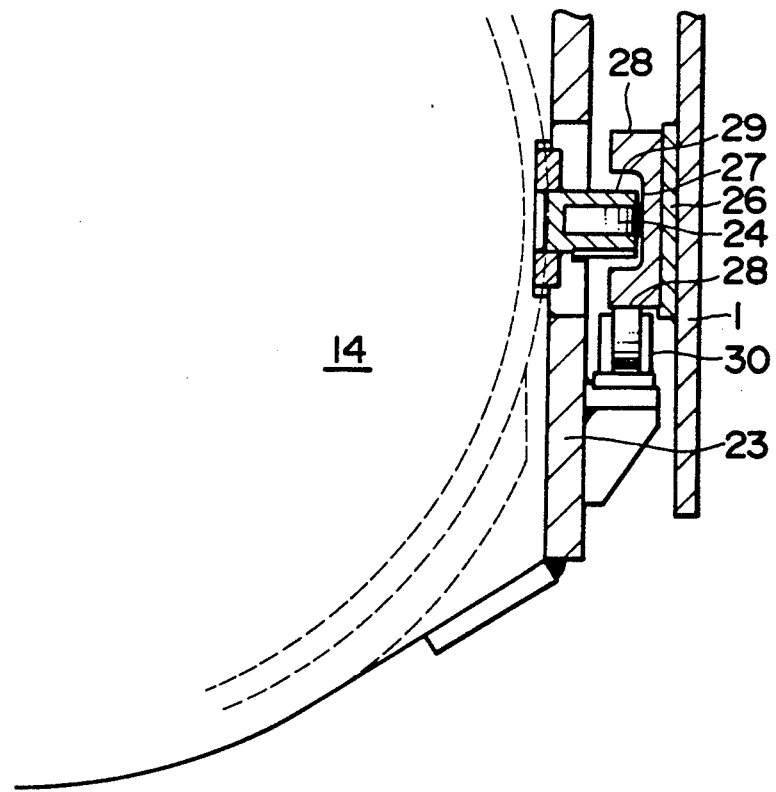

OPENING/CLOSING AND CENTERING DEVICE FOR TIRE VULCANIZER

BACKGROUND OF THE INVENTION

The present invention relates to a tire vulcanizer, and more particularly to an improved opening/closing and centering device in a tire vulcanizer including a long-stroke cylinder for vertically moving an upper mold relative to a lower mold.

In such a tire vulcanizer of the above-mentioned type, the upper mold is required to be maintained in parallel to the lower mold and be centered with a high accuracy. To meet such a requirement, there has been proposed a tire vulcanizer as disclosed in Japanese Patent Laid-open Publication No. 61-134210, for example. The construction of the prior art vulcanizer is schematically shown in FIGS. 7 and 8. Referring to these figures, a lower mold 102 is fixed to a mold support 105 connected through a press cylinder 106 to a press frame 107. A pair of long-stroke cylinders 119 are mounted at right and left side portions of a top frame 108. A pair of piston rods 118 of the long-stroke cylinders 119 are connected to a pressure plate 117 fixed to an upper mold 101. The upper mold 101 is vertically moved to be opened and closed relative to the lower mold 102 by operating the piston rods 118 of the long-stroke cylinders 119. A guide column 109 is connected at its lower end to the pressure plate 117 at the central position thereof. During the vertical movement of the upper mold 101, the guide column 109 is guided by the top frame 108 to be vertically moved. The guide column 109 is formed on its outer circumferential surface with a pair of vertical guide ridges 110 each having a pair of vertical guide surfaces defining a given angle. The top frame 108 is provided with four upper guide rollers and four lower guide rollers 111 rotationally contacting the guide surfaces of the guide ridges 110. A stop jaw 114 with a locking cylinder for locking a closed condition of the upper mold 101 is provided on the top frame 108, and a stop nut 113 abutting against the stop jaw 114 is adjustably mounted on the guide column 109.

However, the opening/closing and centering means in the above-mentioned conventional vulcanizer has the following problems. First, the two long-stroke cylinders 119 are mounted to the top frame 108 at the right and left portions thereof, and the pressure plate 117 is vertically moved by lifting and lowering the two piston rods 118 of the long-stroke cylinders 119. Accordingly, it is difficult to tune both the cylinders 119, with the result that there will arise an error in levelness of the pressure plate 117, to cause an error in parallelism between the upper mold 101 and the lower mold 102.

Secondly, the centering means for the pressure plate 117 is constructed of the guide surfaces of the guide ridges 110 formed on the outer circumferential surface of the guide column 109 fixed at the central position of the pressure plate 117 and the guide rollers 111 rotationally contacting the guide surfaces of the guide ridges 110. However, a mechanical gap of each guide roller 111 at the central position of the pressure plate 117 is magnified at the outer circumferential portion of the circular pressure plate 117. Therefore, the centering of the pressure plate 117 with a high accuracy is difficult, causing a low registerability between the upper mold 101 and the lower mold 102.

SUMMARY OF THE INVENTION

According to the present invention, a single long-stroke cylinder is mounted at the central position of the top frame, and is supported to a mounting frame fixedly mounted on the top frame rather than being fixed directly to the top frame. Furthermore, a centering mechanism for the pressure plate is provided between the pressure plate and each of the side frames so as to adjust the levelness of the pressure plate with respect to both the longitudinal and transverse directions of the pressure plate.

More specifically, there is provided in a tire vulcanizer including a frame comprised of a press base, a top frame and a pair of side frames; a lower mold fixed to said press base; an upper mold adapted to be vertically moved to be opened and closed relative to said lower mold; a long-stroke cylinder mounted to said top frame for moving said upper mold; means for locking said upper mold in a closed position; a guide cylinder adapted to be guided by said top frame at a central position concentric with a press axis; and a clamping cylinder connected to said lower mold; an opening/closing and centering device comprising a mounting plate mounted on said top frame for supporting said long-stroke cylinder at a position concentric with said guide cylinder, a piston rod of said long-stroke cylinder connected to said guide cylinder, a threaded cylinder extending downwardly from a lower end of said guide cylinder, a pressure plate mounted on said upper mold, a fixture fixed to an upper surface of said pressure plate at a central position, an adjusting threaded shaft extending upwardly from said fixture and threadedly engaged with said threaded cylinder, a plurality of first guide rollers rotatably supported at peripheral symmetric positions of said pressure plate in opposed relationship to inside surfaces of said side frames for centering said pressure plate in a longitudinal direction thereof, a plurality of second guide rollers rotatably supported to said pressure plate in perpendicular relationship to said first guide rollers for centering said pressure plate in a transverse direction thereof, a first guide surface formed on each of said inside surfaces of said side frames for contacting said first guide rollers, and a second guide surface formed on each of said inside surfaces of said side frames for contacting said second guide rollers.

As mentioned above, the long-stroke cylinder is singly mounted to the top frame at the central position thereof, and is supported to the mounting plate fixedly mounted on the top frame rather than being fixed directly to the top frame. Therefore, it is possible to eliminate an error in levelness of the pressure plate due to the difficult tuning of the dual long-stroke cylinders as used in the prior art. Furthermore, the first guide rollers for adjusting the levelness of the pressure plate in the longitudinal direction thereof are provided at the peripheral symmetrical positions of the pressure plate in opposed relationship to the inside surfaces of the side frames in such a manner as to rotationally contact the first guide surfaces formed on the inside surfaces of the side frames. Additionally, the second guide rollers for adjusting the levelness of the pressure plate in the transverse direction thereof are also provided in perpendicular relationship to the first guide rollers in such a manner as to rotationally contact the second guide surfaces formed on the inside surfaces of the side frames. Therefore, the centering of the pressure plate can be effected reliably and accurately by the cooperation of the first guide rollers with the first guide surfaces and the cooperation of the second guide rollers with the second guide surfaces. As a result, the registerability of the upper mold with respect to the lower mold can be improved.

Other objects and features of the invention will be more fully understood from the following detailed description and appended claims when taken with the accompanying drawings.

BRIEF DESCRIPTION OF THE DRAWINGS

FIG. 2 is a plan view of the top frame shown in FIG. 1;

FIG. 3 is a horizontal sectional view of the longitudinal centering mechanism according to the present invention;

DETAILED DESCRIPTION OF THE PREFERRED EMBODIMENT

Figure 1:
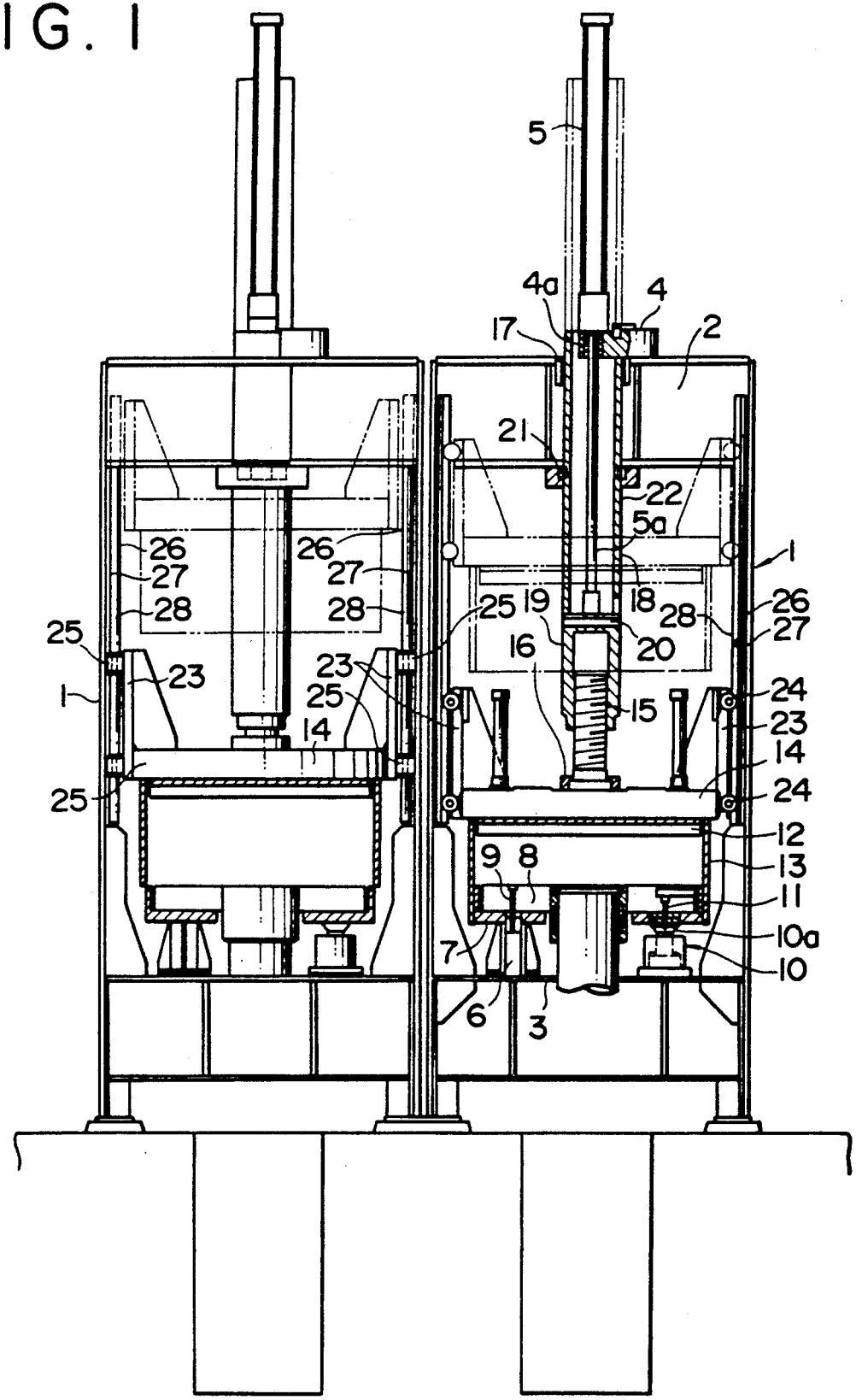
FIG. 1 is a vertical sectional elevation of a preferred embodiment of the present invention.

There will now be described a preferred embodiment of the present invention with reference to FIGS. 1 to 6. Referring to FIGS. 1 and 2, a vulcanizer frame is constructed of a pair of parallel side frames 1, a top frame 2 extending across the top ends of both the side frames 1, and a press base 3 extending across the lower portions of both the side frames 1. In this preferred embodiment, two such vulcanizer frames are juxtaposed on a common foundation. A mounting plate 4 is fixed to the top frame 2 at a central position thereof concentric with a vertical axis of the vulcanizer. The mounting plate 4 is formed with a supporting portion 4a extending horizontally from one side of the plate 4 for supporting the bottom of a long-stroke cylinder 5. A plurality of (e.g., four) support rods 6 are provided to stand on the press base 3 at circumferentially equally spaced positions. A lower mold support 8 for mounting a lower mold (not shown) is fixed by bolts 9 to the support rods 6 with a lower dome 7 interposed therebetween. Further, a plurality of (e.g., four) known clamping cylinders 10 are provided on the press base 3 at circumferentially equally spaced positions. Pressure rods 10a of the clamping cylinders 10 are fixed by bolts 11 to the lower mold support 8, so as to generate a mold clamping force upon closing of upper and lower molds. An upper mold support 12 for mounting an upper mold (not shown) is fixed to the top of an upper dome 13 in opposed relationship to the lower mold support 8. A pressure plate 14 is fixedly mounted on the upper dome 13. A fixture 16 is fixed at a central position on the upper surface of the pressure plate 14, and an adjusting threaded shaft 15 is engaged at its lower end with the fixture 16 to extend upwardly from the pressure plate 14. A guide bush 17 is provided at the central position of the top frame 2 in concentric relationship to the long-stroke cylinder 5, and a guide cylinder 18 is vertically movably inserted through the guide bush 17. A threaded cylinder 19 is integrally formed with the guide cylinder 18 to extend downwardly, and is threadedly engaged with the adjusting threaded shaft 15. A piston rod 5a of the long-stroke cylinder 5 is connected through a hinge 20 to the top of the threaded cylinder 19.

A known locking jaw 21 is rotatably mounted to the top frame 2 in such a manner as to releasably engage a peripheral side surface of the guide cylinder 18 for maintaining a closed condition of the upper and lower molds. A vertically extending cutout 22 for permitting passage of the supporting portion 4a of the mounting plate 4 is formed on the peripheral side surface of the guide cylinder 18.

Figure 4:
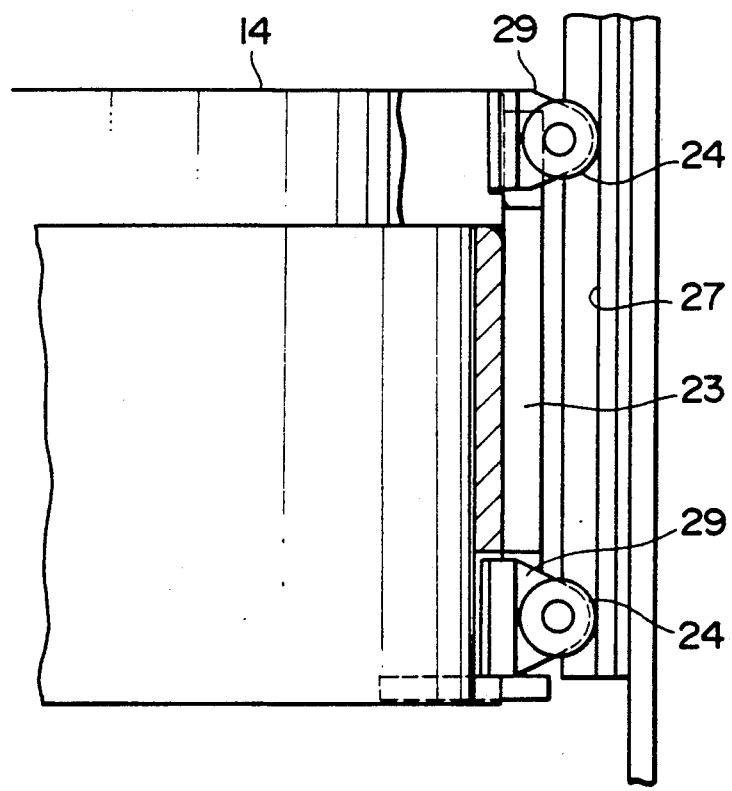
FIG. 4 is an elevational view of the longitudinal centering mechanism.
Figure 5:
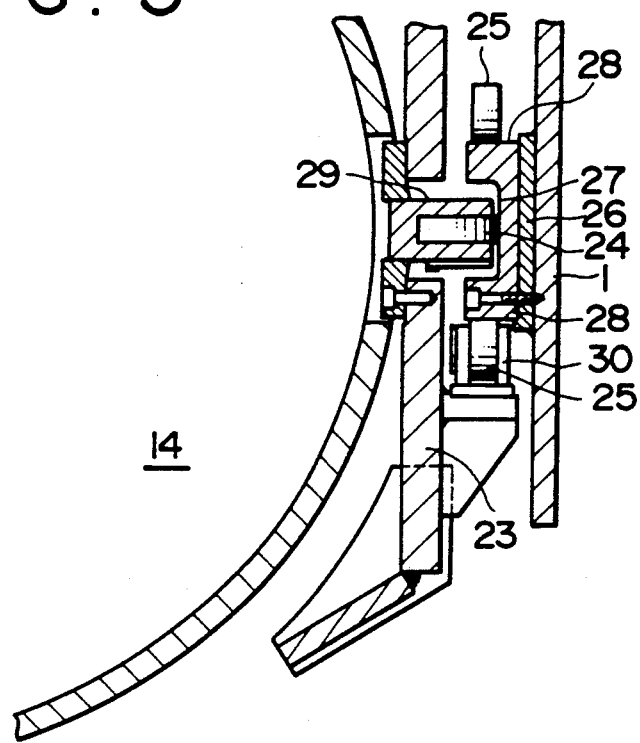
FIG. 5 is a horizontal sectional view of the transverse centering mechanism according to the present invention.
Figure 6:
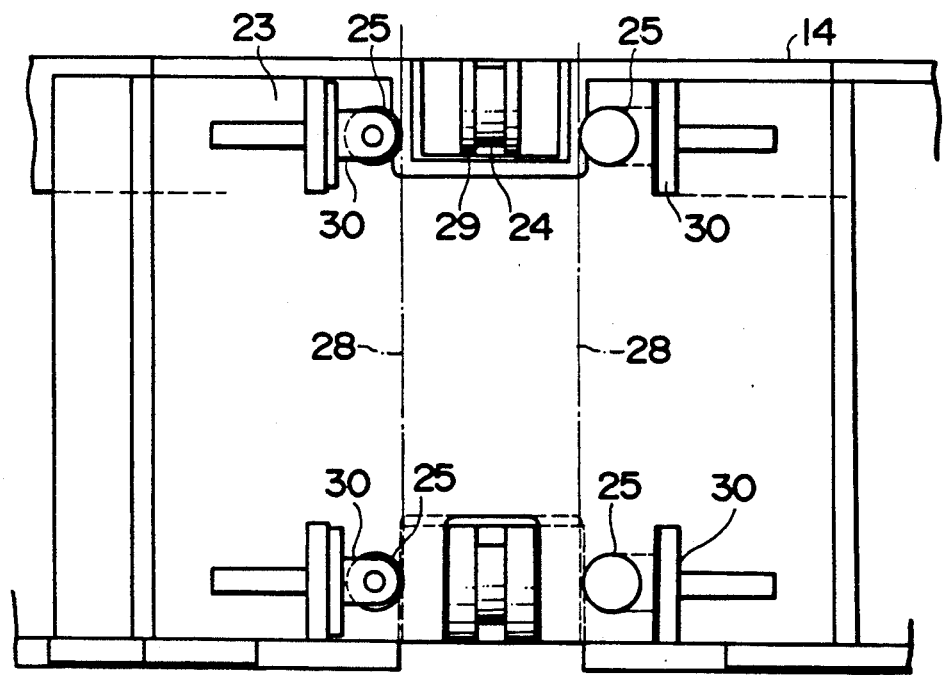
FIG. 6 is a plan view of the transverse centering mechanism.
Figure 7:
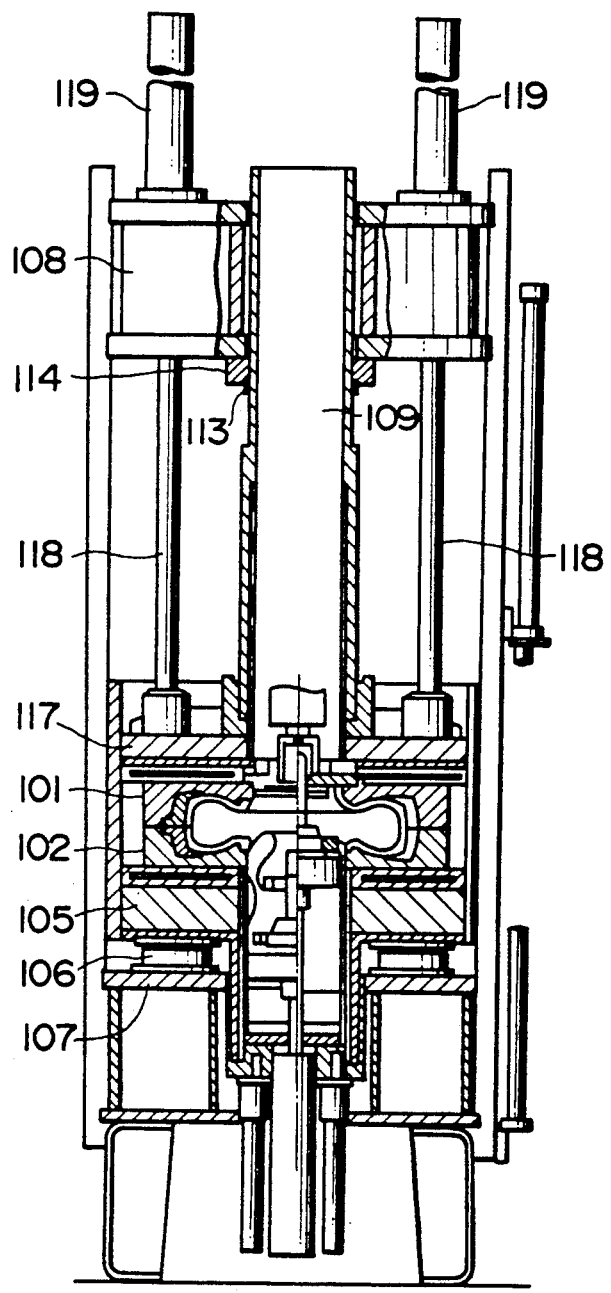
FIG. 7 is a vertical sectional elevation of the tire vulcanizer in the prior art.
Figure 8:
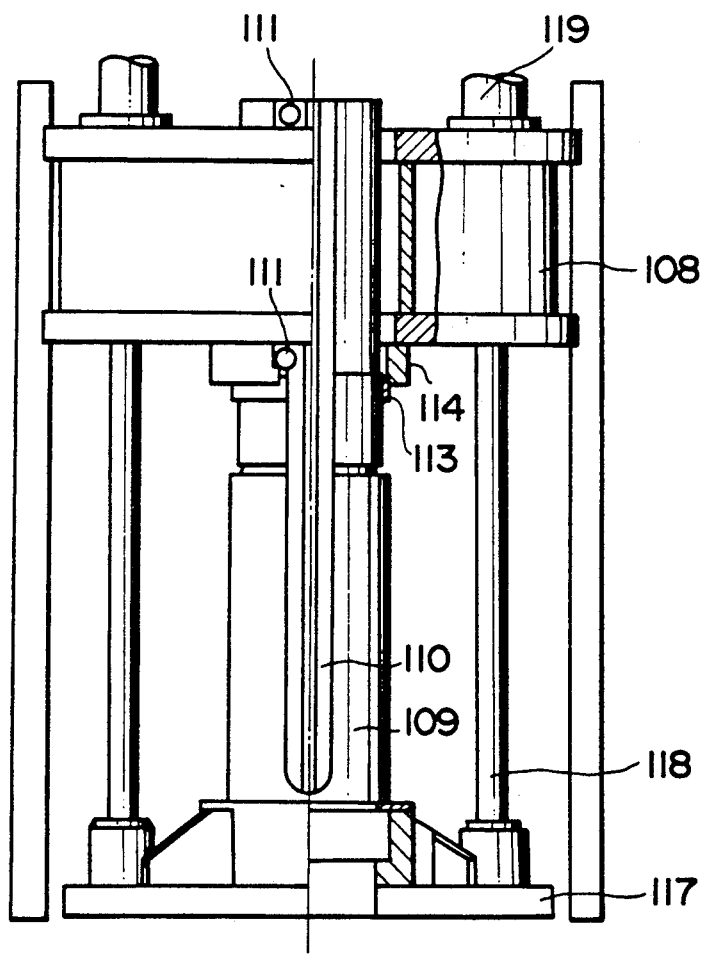
FIG. 8 is a partially cutaway elevational view of an upper part of the tire vulcanizer shown in FIG. 7.

There is provided a centering mechanism for the pressure plate 14 between the pressure plate 14 and each inside surface of the side frames 1. That is, a pair of guide brackets 23 are so provided as to vertically extend upwardly from the pressure plate 14 at opposite symmetrical positions in parallel to the inside surfaces of the side frames 1. Each guide bracket 23 is provided with a plurality of first guide rollers 24 for centering the pressure plate 14 in the longitudinal direction thereof and a plurality of second guide rollers 25 for centering pressure plate 14 in the transverse direction thereof. On the other hand, a guide portion 26 having a first guide surface 27 contacting the first guide roller 24 and a pair of second guide surfaces 28 contacting the second guide rollers 25 is provided on the inside surface of each side frame 1. More specifically, as shown in FIGS. 3 and 4, the two first guide rollers 24 are rotatably supported to a pair of upper and lower support arms 29 mounted to the guide bracket 23 at the central position thereof. Further, as shown in FIGS. 5 and 6, the two upper second guide rollers 25 are rotatably supported to a pair of upper support arms 30 mounted to the guide bracket 23 in such a manner as to interpose the upper first guide roller 24. Similarly, the two lower second guide rollers 25 are rotatably supported to a pair of lower support arms 30 mounted to the guide bracket 23 in such a manner as to interpose the lower first guide roller 24. The guide portion 26 is fixedly mounted on the inside surface of each side frame 1 to extend vertically on the side frame 1. The first guide surface 27 of the guide portion 26 extends vertically on the guide portion 26 at a central position thereof so that the first guide roller 24 may contact the first guide surface 27. On the other hand, the second guide surfaces 28 of the guide portion 26 extend vertically on the guide portion 26 on the opposite sides in perpendicular relationship to the first guide surface 27 as viewed in plan (see FIG. 5) so that the second guide rollers 25 may contact the second guide surfaces 28.

According to the preferred embodiment as mentioned above, the long-stroke cylinder 5 for opening and closing the upper mold is singly mounted to the top frame 2 at the central position. Further, the cylinder 5 is not fixed directly to the top frame 2 but it is supported to the supporting portion 4a of the mounting plate 4. Therefore, it is possible to eliminate an error in levelness of the pressure plate 14 due to the difficult tuning of the dual long-stroke cylinders as used in the prior art vulcanizer. Accordingly, the upper mold can be maintained reliably parallel to the lower mold. Furthermore, as compared with the prior art as mentioned previously wherein the centering of the pressure plate is effected by the central guide column fixed to the pressure plate, the guide cylinder 18 in the preferred embodiment is not fixed to the pressure plate 14 but it is connected through the threaded cylinder 19 and the adjusting threaded shaft 15 retained to the fixture 16 which is fixed to the pressure plate 14. The guide cylinder 18 is guided at its upper portion by the guide bush 17 so that possible falling of the guide cylinder 18 due to the threaded connection between the threaded cylinder 19 and the adjusting threaded shaft 15 may be prevented, and straight advance of the piston rod 5a of the long-stroke cylinder 5 can be maintained by the guide bush 17. Accordingly, the upper mold can be lifted and lowered straight without the necessity of high accuracy.

As to the centering of the pressure plate 14, the first guide rollers 24 for centering the pressure plate 14 in the longitudinal direction thereof and the second guide rollers 25 for centering the pressure plate 14 in the transverse direction thereof are provided at the opposite symmetrical side portions of the pressure plate 14 opposed to the inside surfaces of the side frames 1, and the guide portions 26 are provided on the inside surfaces of the side frames 1 to form the first guide surfaces 27 for contacting the first guide rollers 24 and the second guide surfaces 28 for contacting the second guide rollers 25. Therefore, the positional adjustment of the pressure plate 14 in both the longitudinal and transverse directions thereof as viewed in plan can be effected by the cooperation of the first guide rollers 24 with the first guide surfaces 27 and the cooperation of the second guide rollers 25 with the second guide surfaces 28, respectively. Thus, the centering of the pressure plate 14 can be effected with a high accuracy. As a result, high registerability of the upper mold with respect to the lower mold and high parallelism therebetween can be ensured.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. In a tire vulcanizer including a frame comprised of a press base, a top frame and a pair of side frames; a lower mold fixed to said press base; an upper mold vertically movable to be opened and closed relative to said lower mold; a long-stroke cylinder mounted to said top frame for moving said upper mold; means for locking said upper mold into a closed position; a guide cylinder guided by said top frame at a central position concentric with a press axis; and a clamping cylinder connected to said lower mold;

an opening/closing and centering device comprising:
a mounting plate mounted on said top frame for supporting said long-stroke cylinder at a position concentric with said guide cylinder;
a piston rod of said long-stroke cylinder connected to said guide cylinder;
a threaded cylinder extending downwardly from a lower end of said guide cylinder;
a pressure plate mounted on said upper mold;
a fixture fixed to an upper surface of said pressure plate at a central position thereof;
an adjusting threaded shaft extending upwardly from said fixture and threadedly engaged with said threaded cylinder;
a plurality of first guide rollers rotatably supported by said pressure plate at peripheral symmetric positions thereof in opposed relationship to channel members on inside surfaces of said side frames for centering said pressure plate in a longitudinal direction thereof;
a plurality of second guide rollers rotatably supported by said pressure plate in perpendicular relationship to said first guide rollers for centering said pressure plate in a transverse direction thereof;
a first vertically extending guide surface formed on each of said channel members of said inside surfaces of said side frames and contacting said first guide rollers; and
at least one second vertically extending guide surface formed on outside surfaces of said channel members and contacting said second guide rollers,
wherein there are two of said second guide surfaces with said first guide surface being positioned between said second guide surfaces and extending transverse thereto.

* * * * *